United States Patent [19]

Fischer

[11] Patent Number: 4,781,493

[45] Date of Patent: Nov. 1, 1988

[54] HIGH TEMPERATURE OIL CONTAINMENT BOOM

[75] Inventor: Edward M. Fischer, White Bear Lake, Minn.

[73] Assignee: Minnesota Mining and Manufacturing Company, St. Paul, Minn.

[21] Appl. No.: 899,636

[22] Filed: Aug. 25, 1986

[51] Int. Cl.⁴ .......................................... E02B 15/04
[52] U.S. Cl. ........................................ 405/63; 405/72
[58] Field of Search ...................... 405/63, 72, 64–71; 210/923

[56] References Cited

U.S. PATENT DOCUMENTS

| 4,537,528 | 8/1985 | Simpson | 405/72 |
| 4,599,013 | 7/1986 | Simpson | 405/72 |
| 4,605,586 | 8/1986 | Lane | 405/63 X |
| 4,619,553 | 10/1986 | Fischer | 405/63 |

Primary Examiner—David H. Corbin
Attorney, Agent, or Firm—Donald M. Sell; David W. Anderson

[57] ABSTRACT

A high temperature oil containment boom which allows for the in-situ burning of spilled or leaked oil during offshore oil spill cleanup operations is disclosed. The boom can be used for precautionary fire containment during non-burn oil spill cleanups and can be easily recovered and redeployed.

9 Claims, 1 Drawing Sheet

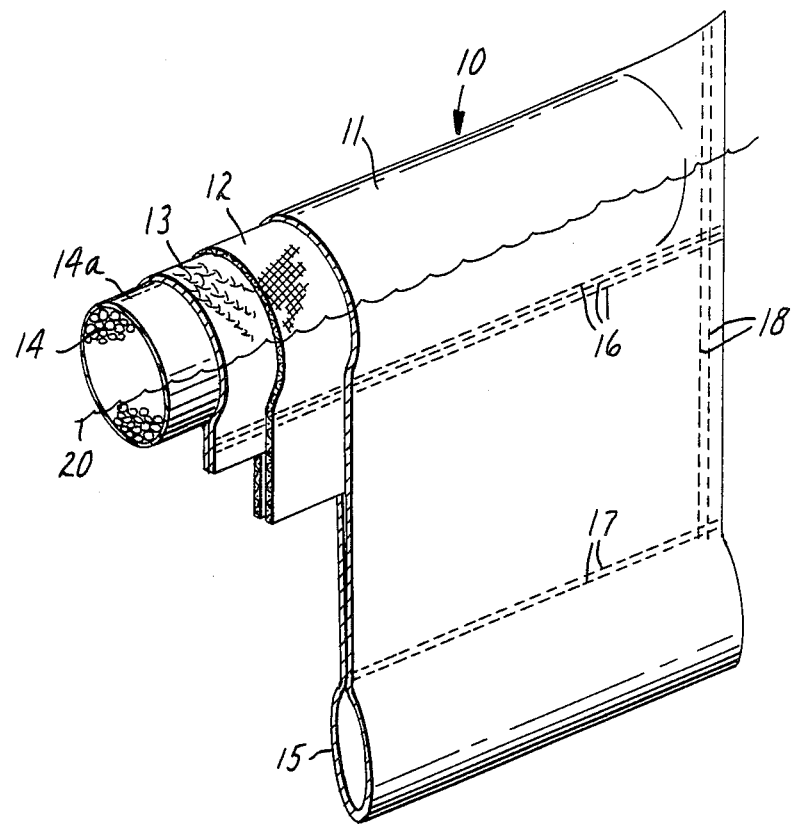

HIGH TEMPERATURE OIL CONTAINMENT BOOM

BACKGROUND OF THE INVENTION

The present invention relates to a high temperature oil containment boom which allows for the in-situ burning of spilled or leaked oil during offshore oil spill cleanup operations. In-situ burning represents one of the most effective means of eliminating large quantities of spilled oil. If conducted properly, with due consideration for the temporary reduction of air quality and the potential for exposure to fire, the in-situ burning of an oil spill can result in the least overall impact to the environment.

The remoteness of the sites of many oil production and transportation activities such as in Alaska, combined with the nature of the environment, provides ideal conditions for oil spill cleanup through in-situ burning. When considered in comparison to mechanical cleanup, chemical dispersants, and natural elimination processes, burning often provides an important option when some of the other techniques alone are impractical.

Research has revealed that oil can be ignited and combustion sustained when the oil layer on water is at least 1 to 2 mm thick. As thicknesses increase beyond this minimum value, there is less tendency for heat loss to the underlying water and, therefore, the chances are greater for efficient combustion. Thick oil layers have been consistently burned with efficiencies in excess of 95%, even under arctic conditions. To achieve such success through burning, it is important to concentrate any spilled oil as quickly as possible and to contain the burning oil so that winds and/or currents can help thicken the oil slick. During the burning process, temperatures in the order of 1100° C. are common.

Conventional oil containment booms are elongated cylinders having a generally circular cross-section. These booms float in water with approximately one-third of the boom submerged below the surface of the water forming a floating barrier to the spilled oil. The booms are typically stored in a roll on the deck of a ship and deployed downwind of a spill where it floats on the surface of the water and temporarily contains the spill.

Two fireproof oil containment booms for in-situ burning of oil spills were exhibited at the 1985 Oil Spill Conference held at Los Angeles, Calif., Feb. 25 to 27, 1985.

According to its brochure, the TTI Geotechnical Resources Ltd. Fireproof Oilspill Containment Boom consists of alternate rigid flotation units 1.668 m long, 1.78 m high weighing 108.8 kg and flexible (accordian folded) panels 0.906 m long, 1.70 m high weighing 102 kg connected together by connectors 0.07 m long, 1.67 m high weighing 10 kg. The boom is of stainless steel construction and the maximum exposure temperature is stated to be 980° C.

The available literature for the Globe International Inc. Pyroboom fireproof oil spill barrier states that it utilizes a unique blend of refractory and metallic materials in a woven fabric coated with a high temperature polymer coating (silicone rubber). Flotation is provided by a series of stainless steel hemispheres containing a high temperature resistant, closed cellular material. Two such hemispheres with the woven fabric enclosed between them are bolted together to form spheres 16 3/16 inches (41 cm) in diameter spaced 34 inches (86 cm) apart at their centerlines along the length of the woven fabric. The boom has an overall height of 30 inches (76 cm) with a draft of 20 inches (51 cm) and a freeboard of 10 inches (25 cm), and weighs 8 to 10 pounds per lineal foot (11.9 to 14.5 kg/m). The operating temperature range of the boom is stated to be $-55°$ F. to $+2400°$ F. ($-48°$ C. to 1315° C.).

A fire resistant oil containment boom system designated as the SeaCurtain ReelPak FireGard Oil-Fire Containment Boom System is described in a brochure issued by Kepner Plastics Fabricators, Inc. That boom system appears to comprise compartmented circular sections containing a continuous stainless steel coil wire covered with a double walled foam-containing refractory fabric with an additional portion extending downwardly from the circular section, the bottom edge of the downwardly extending section having a chain ballast member attached thereto. The boom is stored on a reel from which it is deployed. The boom is stated to have an operating temperature range from $-40°$ F. to over 2000° F. ($-40°$ C. to 1093° C.) and, depending on model, weighs 2.2 lbs. to 4.2 lbs. per lineal foot (3.3 to 6.3 kg/m).

U.S. Pat. No. 4,537,528 is directed to a fireproof boom for containing a flammable pollutant on a water surface, the boom comprising a flotation member of foamed polypropylene and at least two layers of heat-resistant, water-sorbent material surrounding the flotation member and extending into the water in the form of a depending skirt. The skirt functions to draw water up into the layers of heat-resistant material forming steam in the presence of flaming pollutant thereby allowing only the outer layer of heat-resistant material to become slightly singed. It is understood that a bottom-tensioned, cylindrical-flotation fire containment boom is manufactured by Fire Control Inc. utilizing the teachings of said patent. The boom consists of multiple layers of fire-resistant, wicking fabric positioned over steel canisters for flotation. An additional sacrifical layer and a coarse wire-mesh barrier are used externally for abrasion resistance. The boom weighs 7 lbs. per lineal foot (10.5 kg/m).

An oil boom system utilizes a multilayered, fire-resistant blanket, provided by Minnesota Mining and Manufacturing Company (3M Company), the assignee of the present invention, for use as an add-on high temperature protective blanket to convert most conventional types of boom for the containment of burning oil. The blanket is placed about the periphery of the boom and is held in position by any number of fastening systems.

SUMMARY OF THE INVENTION

The present invention relates to a high temperature oil containment boom which allows for the in-situ burning of spilled or leaked oil and, in the event that the contained oil as not burned, the boom can be recovered, cleaned in the same manner as a conventional oil containment boom and stored for future deployment. The boom is capable of withstanding sustained exposure to temperatures on the order of 1200° C., thus allowing in-situ burning of the contained oil during offshore oil spill cleanup operations. The oil boom can also be employed as a precautionary measure during the more traditional oilspill cleanup operations to provide protection should accidental ignition of the spilled oil occur. In this situation, the boom would, of course, be recovered and processed for redeployment.

The oil boom of the present invention comprises an outer layer of polymer coated fabric, a first underlayer of high temperature resistant and moisture resistant refractory fabric and a second underlayer of a high or intermediate temperature resistant refractory fabric which constrains and assists in retaining the integrity of a low density, high temperature resistant core. The layers are unified by sewing with high temperature resistant ceramic thread or by mechanical fasteners.

BRIEF DESCRIPTION OF THE DRAWINGS

FIG. 1 is a perspective view, partly in section, of the high temperature oil containment boom of the present invention.

DETAILED DESCRIPTION OF THE INVENTION

The invention can best be understood by reference to the drawing. The high temperature oil containment boom 10 comprises an outer layer 11 of polymer coated fabric, a first underlayer 12 of high temperature resistant and moisture resistant refractory fabric, a second underlayer 13 of high or intermediate temperature resistant refractory fabric which constrains and assists in retaining the integrity (shape) of low density, high temperature resistant flotation core 14. Water line 20 shows that the boom 10 floats on the water with approximately one-third of the boom submerged below the surface.

Polymer coated fabric outer layer 11 is preferably a nylon fabric coated with low alkali content polyvinylchloride (PVC), having a basis weight of 0.61 kg/m$^2$ and available as Style 145230 from VERSEID AG. Outer layer 11 allows the high temperature oil boom to be conveniently handled and function, if desired, as a conventional non-fire oil containment boom. Outer layer 11, during fire containment, melts to the water line causing the high temperature resistant refractory fabric first underlayer 12 to be exposed to the burning oil. Outer layer 11, may also, if desired, be provided with a ballast chain pocket 15.

First underlayer 12 of high temperature resistant and moisture resistant refractory fabric is preferably a 1.29 mm thick open mesh, plain weave, 3×3 picks/cm fabric woven from 1800 denier, 1.5/4 plied continuous polycrystalline metal oxide fiber yarn comprising, by weight, 62% aluminum oxide, 14% boron oxide and 24% silicon dioxide and commercially available as Nextel 312 fabric from 3M Company. This specific fabric has a basis weight of 0.89 kg/m$^2$. A useful but heavier and also more expensive fabric for first underlayer 12 is a tightly woven 3.35 mm thick, closed mesh, plain weave, 8×3 picks/cm fabric woven from the same Nextel 312 yarn. This heavier fabric has a basis weight of 1.35 kg/m$^2$. Other high temperature resistant and moisture resistant fabrics which can be used as first underlayer 12 include fabrics fabricated from Nextel 440 ceramic yarn comprising, by weight, 70% aluminum oxide, 28% silicon dioxide and 2% boron oxide (3M Company), Astroquartz ceramic fibers (J. P. Stevens) and leached fiberglass filaments (Hitco or Haveg).

The high temperature resistant and moisture resistant refractory fabric of first underlayer 12 may optionally be coated with a polymer coating such as a silicone rubber, a neoprene rubber, a fluorinated elastomer or an acrylic polymer. The polymer coating serves to hold the yarns of the fabric firmly in place during assembly and provides an abrasion resistant coating for the fabric. A particularly preferred coating is Neoprene GN (duPont), which is applied to the fabric at a coating weight of 0.16 kg/m$^2$. The polymer coating is applied by dip coating, with the polymer solution coating the yarn while leaving the mesh interstices substantially open, allowed to dry and cured at a temperature of 160° C. It will be appreciated that the polymer coating, in those areas exposed to the heat of combustion of the contained oil, will be burned off but it will have served its processing and protection functions. The fabric of first underlayer 12 retains its high temperature and moisture resistant characteristics even without the polymer coating.

The second underlayer 13 preferably comprises a 0.63 mm thick, high tensile strength, woven fiberglass fabric, Style 1583, weighing 0.54 kg/m$^2$ (Clark Schwebel). Layer 13 allows the boom to be assembled into a unified structure by constraining the low density, high temperature resistant core 14 and helps retain the integrity (shape) of the core 14 after exposure to burning oil. It is also useful in preventing the passage of oil through the boom during use.

High temperature resistant flotation core 14 preferably comprises inert, low density ceramic macrospheres (3M Company) which, especially for convenience in assembling the boom, may be retained in a plastic containment bag 14a. 3M Ceramic Macrospheres are inert, low density ceramic macrospheres containing a multiplicity of minute independent closed air cells surrounded by a tough outer shell. The spheres are impermeable to water and other fluids and, being a true ceramic, are functional at extremely high temperatures. It will be appreciated in this instance also that the plastic containment bag 14a, in those areas exposed to the heat of combustion of the spilled oil may melt; however, it will have served its processing function. Furthermore, layers 12 and 13 will serve to contain the ceramic macrospheres before and after exposure to burning oil. Pyrofoam insulation particles, available from High Temperature Insulation Materials, have also been found to be satisfactory for flotation core 14. Pyrofoam insulation particles are small, inert, low density, air filled, closed cells of expanded obsidian and are functional at extremely high temperatures.

Boom 10 is fabricated by layerwise assembling a composite of outer layer 11, first underlayer 12 and second underlayer 13 in registration over flotation core 14. The thus formed composite structure is unified by sewing along lines 16 using a high temperature resistant ceramic thread such as Nextel AT 32 ceramic thread (3M Company). Instead of sewing with the ceramic thread, a stainless steel wire could be used to simiarly "sew" the structure or suitably spaced mechanical fasteners could be employed. If desired, the outer layer 11 could also be sewn together along lines 17 providing a ballast chain pocket 15. Since seam lines 17 are below water during boom use, they are preferably produced by using heavy duty nylon thread. Boom 10 is preferably fabricated into individual flotation compartments or sections by sewing along lines 18 with high temperature resistant ceramic thread, each section measuring about five feet (1.5 m) in length. A typical boom is 25 feet (7.6 m) in length and thus comprises five sections. Longer length booms are fabricated by joining such individual booms using conventional connector means. The sectional design assists in handleability and eases storage of the booms, especially long length booms, since the sections allow for accordian folding of the boom. Also, accidental tearing or rupturing of the boom would limit the amount of flotation media which would be released and require recovery.

Since each of the components of boom 10 is non-hygroscopic, very little water is retained in the boom and recovery of the boom is not hampered by the added weight of absorbed water. In fact, after a fire use, the boom is lighter in weight since outer layer 11 and the protective polymer coating on first underlayer 12 would have been substantially burned off by the fire.

Laboratory testing has shown that high temperature oil containment boom 10 can function as a conventional oil containment boom and then can be redeployed for use in a burning operation. To further evaluate the utility of oil boom 10 under simulated fire use conditions, a 9 foot (2.7 m) diameter ring of an 8 inch (20.3 cm) float diameter boom with a 12 inch (30.4 cm) skirt, weighing 5.8 pounds per lineal feet (8.7 kg per lineal meter), was fire tested for two hours with a continuous feed heptane fire. The boom was extremely effective as a high temperature fire containment product at burning temperatures up to 1325° F. (720° C.). Smaller lab tests have been run up to 1800° F. (980° C.) with all materials remaining strong and unchanged.

Although oil boom 10 has been illustrated and described herein with some specificity, various modifications may readily suggest themselves and are contemplated. As one example, outer layer 11 could be produced using a polymer coated high temperature resistant refractory fabric although that would increase the cost and reduce handleability somewhat.

What is claimed is:

1. A high temperature oil containment boom comprising an outer layer of polymer coated fabric, a first underlayer of high temperature resistant and moisture resistant refractory fabric and a second underlayer of an intermediate or high temperature resistant refractory fabric surrounding a low density, high temperature resistant flotation core, said layers being secured together at least about their peripheral edges.

2. A high temperature oil containment boom according to claim 1 wherein said outer layer of polymer coated fabric is nylon fabric coated with low alkali content polyvinylchloride.

3. A high temperature oil containment boom according to claim 1 wherein said first underlayer comprises a fabric woven from a ceramic fiber yarn.

4. A high temperature oil containment boom according to claim 3 wherein said ceramic fiber yarn comprises 62 weight percent aluminum oxide, 14 weight percent boron oxide and 24 weight percent silicon dioxide.

5. A high temperature oil containment boom according to claim 4 wherein said ceramic fiber yarn is coated with a polymeric coating selected from silicone rubber, neoprene rubber, fluorinated elastomer or an acrylic polymer.

6. A high temperature oil containment boom according to claim 1 wherein said second underlayer is a woven fabric of fiberglass.

7. A high temperature oil containment boom according to claim 1 wherein said high temperature resistant flotation core is comprised of low density ceramic spheres or expanded obsidian.

8. A high temperature oil containment boom according to claim 1 wherein said layers are secured together at least about their peripheral edges by high temperature resistant ceramic thread, stainless steel wire or mechanical fasteners.

9. A high temperature oil containment boom according to claim 8 wherein said outer layer extends distally of said flotation core, the outer free end thereof being secured together to form a longitudinally extending ballast chain pocket.

* * * * *